(12) United States Patent
Freeman et al.

(10) Patent No.: US 10,683,770 B2
(45) Date of Patent: Jun. 16, 2020

(54) TURBINE SHROUD ASSEMBLY HAVING CERAMIC MATRIX COMPOSITE TRACK SEGMENTS WITH METALLIC ATTACHMENT FEATURES

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Bruce E. Varney, Greenwood, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 164 days.

(21) Appl. No.: 15/956,359

(22) Filed: Apr. 18, 2018

(65) Prior Publication Data
US 2018/0340440 A1 Nov. 29, 2018

Related U.S. Application Data

(60) Provisional application No. 62/510,009, filed on May 23, 2017.

(51) Int. Cl.
*F01D 11/08* (2006.01)
*F01D 9/04* (2006.01)
(Continued)

(52) U.S. Cl.
CPC .............. *F01D 11/08* (2013.01); *F01D 5/284* (2013.01); *F01D 9/04* (2013.01); *F01D 9/042* (2013.01);
(Continued)

(58) Field of Classification Search
CPC . F01D 11/08; F01D 5/284; F01D 9/04; F01D 9/042; F01D 25/246;
(Continued)

(56) References Cited

U.S. PATENT DOCUMENTS

| | | | |
|---|---|---|---|
| 875,647 A | 12/1907 | Bassett | |
| 1,669,388 A * | 5/1928 | Chapman | B25G 1/00 279/96 |

(Continued)

FOREIGN PATENT DOCUMENTS

| | | |
|---|---|---|
| EP | 3106630 A1 | 12/2016 |
| EP | 3118417 A1 | 1/2017 |

OTHER PUBLICATIONS

Muktinutalapati—Materials for Gas Turbines; Publisher InTech; Advances in Gas Turbine Technology; ISSBN 978-953-307-611-9; pp. 309-310. (Year: 2011).*

(Continued)

*Primary Examiner* — Woody A Lee, Jr.
*Assistant Examiner* — Brian Christopher Delrue
(74) *Attorney, Agent, or Firm* — Barnes & Thornburg LLP

(57) ABSTRACT

A turbine shroud adapted for use in a gas turbine engine is disclosed in this paper. The turbine shroud includes a blade track segment comprising ceramic matrix composite materials and an attachment unit comprising metallic materials. The attachment unit is coupled to the blade track segment and is configured to interface with other metallic components in the gas turbine engine.

20 Claims, 6 Drawing Sheets

(51) Int. Cl.
*F01D 5/28* (2006.01)
*F01D 25/24* (2006.01)

(52) U.S. Cl.
CPC ........ *F01D 25/246* (2013.01); *F05D 2220/32* (2013.01); *F05D 2240/11* (2013.01); *F05D 2240/90* (2013.01); *F05D 2300/50212* (2013.01); *F05D 2300/6033* (2013.01)

(58) Field of Classification Search
CPC ............ F01D 2220/32; F01D 2240/11; F01D 2240/90; F01D 2300/50212; F01D 2300/6033
See application file for complete search history.

(56) References Cited

U.S. PATENT DOCUMENTS

| | | | | |
|---|---|---|---|---|
| 2,317,338 | A | | 2/1942 | Rydmark |
| 2,821,357 | A | | 10/1950 | Schorner |
| 2,684,831 | A | * | 7/1954 | Grantham ............... F01D 5/081 416/97 R |
| 2,949,278 | A | * | 8/1960 | McCormick ........... F01D 5/326 416/220 R |
| 3,010,696 | A | * | 11/1961 | Everett ................... F01D 5/081 416/97 R |
| 4,802,824 | A | | 2/1989 | Gastebois et al. |
| 5,368,444 | A | | 11/1994 | Anderson |
| 5,405,245 | A | | 4/1995 | Cornelius |
| 5,591,003 | A | * | 1/1997 | Boyd ..................... F01D 9/042 415/209.2 |
| 6,022,190 | A | * | 2/2000 | Schillinger ............. F01D 5/081 415/115 |
| 6,042,315 | A | * | 3/2000 | Miller ..................... F16B 19/00 411/383 |
| 6,648,597 | B1 | * | 11/2003 | Widrig ................... C04B 37/001 415/200 |
| 6,773,215 | B2 | * | 8/2004 | Cuva ...................... F16B 5/10 411/552 |
| 6,830,437 | B2 | * | 12/2004 | Cairo ..................... B32B 18/00 415/173.1 |
| 6,884,026 | B2 | * | 4/2005 | Glynn ..................... F01D 11/08 415/113 |
| 7,044,709 | B2 | * | 5/2006 | Bruce ..................... F01D 9/04 415/135 |
| 7,080,971 | B2 | * | 7/2006 | Wilson ................... F01D 5/147 416/92 |
| 7,278,820 | B2 | * | 10/2007 | Keller ..................... F01D 11/08 415/173.1 |
| 7,416,362 | B2 | * | 8/2008 | North ..................... F16B 5/0241 267/150 |
| 7,494,317 | B2 | * | 2/2009 | Keller ..................... F01D 11/025 415/136 |
| 7,722,317 | B2 | * | 5/2010 | Schiavo ................. F01D 25/246 415/138 |
| 7,726,936 | B2 | * | 6/2010 | Keller ..................... F01D 11/12 415/173.4 |
| 7,866,141 | B2 | * | 1/2011 | Le Docte ................ F02K 1/822 181/220 |
| 7,874,059 | B2 | * | 1/2011 | Morrison ............... F16B 5/0266 29/446 |
| 7,950,234 | B2 | * | 5/2011 | Radonovich .......... F01D 11/122 415/173.1 |
| 7,988,395 | B2 | * | 8/2011 | Steffier .................. F16B 3/00 411/283 |
| 8,231,354 | B2 | * | 7/2012 | Campbell ............... B23P 15/04 416/193 A |
| 8,256,088 | B2 | * | 9/2012 | James .................... F01D 9/044 29/446 |
| 8,616,801 | B2 | * | 12/2013 | Morrison ............... C04B 35/80 403/205 |
| 8,727,730 | B2 | * | 5/2014 | Liotta .................... F01D 5/282 416/193 A |
| 8,740,552 | B2 | * | 6/2014 | Marusko ................ F01D 9/04 415/173.1 |
| 8,790,067 | B2 | * | 7/2014 | McCaffrey ............. F01D 11/18 415/1 |
| 8,807,577 | B2 | * | 8/2014 | Lai ......................... B62M 1/00 280/11.28 |
| 8,905,709 | B2 | * | 12/2014 | Dziech .................. F01D 11/005 415/173.1 |
| 8,926,270 | B2 | * | 1/2015 | Karafillis ................ F01D 9/02 415/173.1 |
| 8,932,009 | B2 | * | 1/2015 | Moraines ............... F01D 11/24 415/116 |
| 8,951,017 | B2 | * | 2/2015 | Cordier .................. F01D 5/282 416/220 R |
| 8,998,565 | B2 | * | 4/2015 | Foster .................... F01D 25/246 415/116 |
| 9,149,997 | B2 | * | 10/2015 | Foster .................... F04D 29/023 |
| 9,151,226 | B2 | * | 10/2015 | Zimmermann ........ F02K 3/04 |
| 9,188,024 | B2 | * | 11/2015 | Tardif .................... F01D 25/24 |
| 9,587,517 | B2 | * | 3/2017 | Vetters ................... F01D 25/246 |
| 9,828,861 | B2 | * | 11/2017 | Le Hong ................ F01D 5/282 |
| 9,963,990 | B2 | * | 5/2018 | Vetters ................... F01D 11/08 |
| 10,370,997 | B2 | * | 8/2019 | Vetters ................... F01D 9/02 |
| 2004/0247835 | A1 | * | 12/2004 | Keener ................... B05D 7/16 428/160 |
| 2005/0158168 | A1 | * | 7/2005 | Bruce ..................... F01D 9/04 415/173.1 |
| 2005/0265827 | A1 | * | 12/2005 | Wilson, Jr. ............. F01D 11/18 415/173.3 |
| 2007/0031258 | A1 | * | 2/2007 | Campbell ............... F01D 9/04 416/189 |
| 2009/0220345 | A1 | * | 9/2009 | Krutzfeldt ............. F01D 5/3038 416/220 R |
| 2010/0061858 | A1 | * | 3/2010 | Jones ..................... F04D 29/023 416/204 R |
| 2010/0172748 | A1 | * | 7/2010 | Snook .................... F01D 9/02 415/191 |
| 2010/0189562 | A1 | * | 7/2010 | Blanchard ............. B29D 99/0025 416/219 R |
| 2012/0260670 | A1 | * | 10/2012 | Foster .................... F01D 11/08 60/798 |
| 2014/0030072 | A1 | * | 1/2014 | Hillier ................... F01D 11/001 415/173.1 |
| 2014/0271147 | A1 | * | 9/2014 | Uskert .................... F01D 11/24 415/173.2 |
| 2014/0294572 | A1 | * | 10/2014 | Hillier ................... F01D 11/122 415/173.6 |
| 2015/0044049 | A1 | | 2/2015 | Lamusga et al. |
| 2015/0377035 | A1 | * | 12/2015 | Freeman ................ F01D 11/12 416/191 |
| 2016/0003077 | A1 | * | 1/2016 | Banks ................... F01D 11/005 60/806 |
| 2016/0137559 | A1 | * | 5/2016 | Chamberlain ......... C04B 41/88 428/454 |
| 2016/0138406 | A1 | | 5/2016 | Freeman |
| 2016/0169025 | A1 | | 6/2016 | Lamusga et al. |
| 2016/0186999 | A1 | | 6/2016 | Freeman et al. |
| 2016/0201483 | A1 | | 7/2016 | Engel et al. |
| 2016/0201484 | A1 | | 7/2016 | Engel et al. |
| 2016/0305265 | A1 | * | 10/2016 | Stapleton .............. F04D 29/321 |
| 2016/0348528 | A1 | * | 12/2016 | Vetters ................... F01D 11/08 |
| 2017/0002674 | A1 | | 1/2017 | Vetters et al. |
| 2017/0167279 | A1 | * | 6/2017 | Kirby .................... F01D 11/001 |
| 2017/0321567 | A1 | * | 11/2017 | Vetters ................... F01D 11/02 |

OTHER PUBLICATIONS

Extended European Search Report, European Application No. 18168738.5-1006, dated Jan. 17, 2019, 6 pages.

* cited by examiner

TURBINE SHROUD ASSEMBLY HAVING CERAMIC MATRIX COMPOSITE TRACK SEGMENTS WITH METALLIC ATTACHMENT FEATURES

CROSS REFERENCE TO RELATED APPLICATIONS

This application claims priority to and the benefit of U.S. Provisional Patent Application No. 62/510,009, filed 23 May 2017, the disclosure of which is now expressly incorporated herein by reference.

FIELD OF THE DISCLOSURE

The present disclosure relates generally to gas turbine engines, and more specifically to turbine shroud assemblies used in gas turbine engines to guide hot gasses moving through such engines so that the hot gasses interact with corresponding turbine blades.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds guide hot gasses moving through the engine so that the gasses interact with the turbine blades.

Turbine shrouds are often coupled to an engine case. Such shrouds sometimes include components made from materials that have different coefficients of thermal expansion. Due to the differing coefficients of thermal expansion, the components of some turbine shrouds expand at different rates when exposed to hot gasses. In some examples, coupling such components to relatively cool metallic components of the engine case can present design challenges.

SUMMARY

The present disclosure may comprise one or more of the following features and combinations thereof.

A turbine shroud adapted for use in a gas turbine engine is disclosed. The turbine shroud may include a blade track segment comprising ceramic matrix composite materials and an attachment unit comprising metallic materials. The blade track segment may be formed to include an arcuate runner that extends partway about a central axis and a mount post that extends radially outward from the arcuate runner. The attachment unit may be coupled to the blade track segment and may be configured to interface with other metallic components in the gas turbine engine.

In illustrative embodiments, the attachment unit includes a forward hanger arranged along an axially forward side of the mount post and an aft hanger arranged along an axially aft side of the mount post. Each of the forward and aft hangers may be engaged with the mount post and may be shaped to provide a radially-inwardly facing surface configured to interface with a radially-outwardly facing surface of another component included in the gas turbine engine.

In illustrative embodiments, the mount post is formed to include a pin-receiving hole that extends axially through the mount post ant the attachment unit includes a mount pin that extends from the forward hanger to the aft hanger through the pin-receiving hole to couple the attachment unit to the blade track segment. The forward hanger may be spaced axially apart from the aft hanger.

In illustrative embodiments, the forward hanger may be formed to include a recessed pocket. The aft hanger may be formed to include a recessed pocket that cooperates with the recessed pocket of the forward hanger to form a radially-inwardly-opening mount-post receiving space. The mount post may be arranged inside the mount-post receiving space.

In illustrative embodiments, the mount-post receiving space is sized so that the attachment unit is interference fit with the mount post of the blade track segment. The forward hanger may be bonded to the aft hanger along the edge of the mount-post receiving space. The forward hanger may be bonded to the aft hanger by a diffusion weld formed along the edge of the mount-post receiving space. The mount-post receiving space may be sized so that the attachment unit is interference fit with the mount post of the blade track segment.

In illustrative embodiments, the forward hanger is formed to include a recessed pocket, the aft hanger is formed to include a recessed pocket that cooperates with the recessed pocket of the forward hanger to form a radially-inwardly-opening mount-post receiving space, and the mount post is arranged inside the mount-post receiving space. The mount-post receiving space may be sized so that the attachment unit is interference fit with the mount post of the blade track segment.

In illustrative embodiments, the mount post may include a stem that extends from the runner of the blade track segment and a head that extends from the stem. The head may be shaped to extend axially or circumferentially from the stem to form a radial retention surface. The mount-post receiving space may be formed to have a shape complementary to the shape of the head included in the mount post such that the retention surface of the head engages complementary surfaces of the attachment unit and the blade track segment is blocked from radially-inward movement relative to the attachment unit.

In illustrative embodiments, the head of the mount post forms a dovetail shape. The mount-post receiving space may be sized so that the attachment unit is interference fit with the mount post of the blade track segment.

In illustrative embodiments, the forward hanger is bonded to the aft hanger along the edge of the mount-post receiving space. The forward hanger may be bonded to the aft hanger by a diffusion weld formed along the edge of the mount-post receiving space.

According to the present disclosure, a turbine shroud adapted for use in a gas turbine engine may include a blade track segment comprising ceramic matrix composite materials and an attachment unit comprising metallic materials coupled to the blade track segment. The blade track segment may be formed to include an arcuate runner that extends partway about a central axis and a mount post that extends radially outward from the arcuate runner. The attachment unit may be configured to interface with other metallic components in the gas turbine engine.

In illustrative embodiments, the attachment unit includes a first hanger arranged along a first side of the mount post and a second hanger arranged along a second side of the mount post opposite the first side. Each of the first and second hangers may be engaged with the mount post and shaped to provide a radially-inwardly facing surface configured to interface with a radially-outwardly facing surface of another component included in the gas turbine engine.

In illustrative embodiments, the first hanger is formed to include a recessed pocket, the second hanger is formed to include a recessed pocket that cooperates with the recessed pocket of the forward hanger to form a radially-inwardly-opening mount-post receiving space, the mount post is arranged inside the mount-post receiving space. The forward hanger may be bonded to the aft hanger along the edge of the mount-post receiving space by a diffusion weld. The mount-post receiving space may be sized so that the attachment unit is interference fit with the mount post of the blade track segment.

In illustrative embodiments, the mount post is formed to include a pin-receiving hole that extends axially through the mount post. The attachment unit includes a mount pin that extends from the forward hanger to the aft hanger through the pin-receiving hole to couple the attachment unit to the blade track segment.

In illustrative embodiments, the mount post includes a stem that extends from the runner of the blade track segment and a head that extends from the stem, the head is shaped to extend axially or circumferentially from the stem to form a radial retention surface. The mount-post receiving space is formed to have a shape complementary to the shape of the head included in the mount post such that the retention surface of the head engages complementary surfaces of the attachment unit and the blade track segment is blocked from radially-inward movement relative to the attachment unit. The forward hanger may be bonded to the aft hanger along the edge of the mount-post receiving space by a diffusion weld.

These and other features of the present disclosure will become more apparent from the following description of the illustrative embodiments.

DETAILED DESCRIPTION OF THE DRAWINGS

Figure 1:
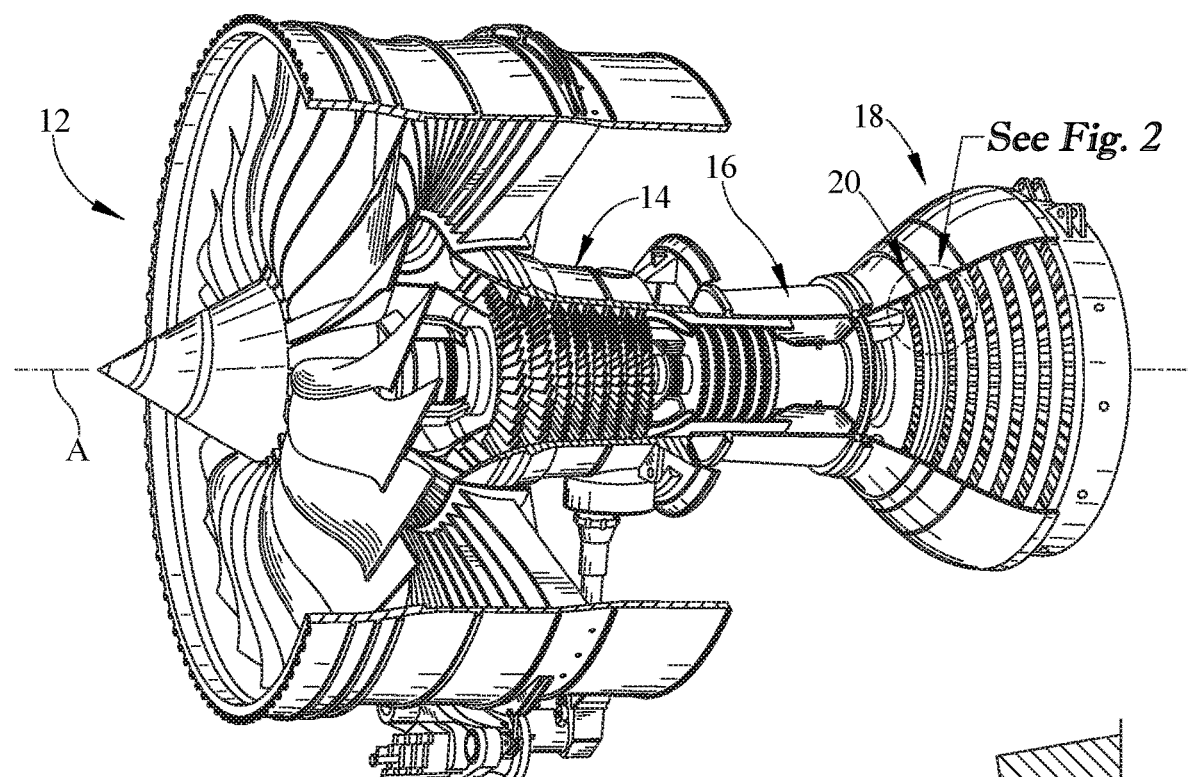
FIG. 1 is a cut-away perspective view of a gas turbine engine showing that the exemplary engine includes a fan driven by an engine core having a compressor, a combustor, and a turbine including a turbine shroud assembly.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
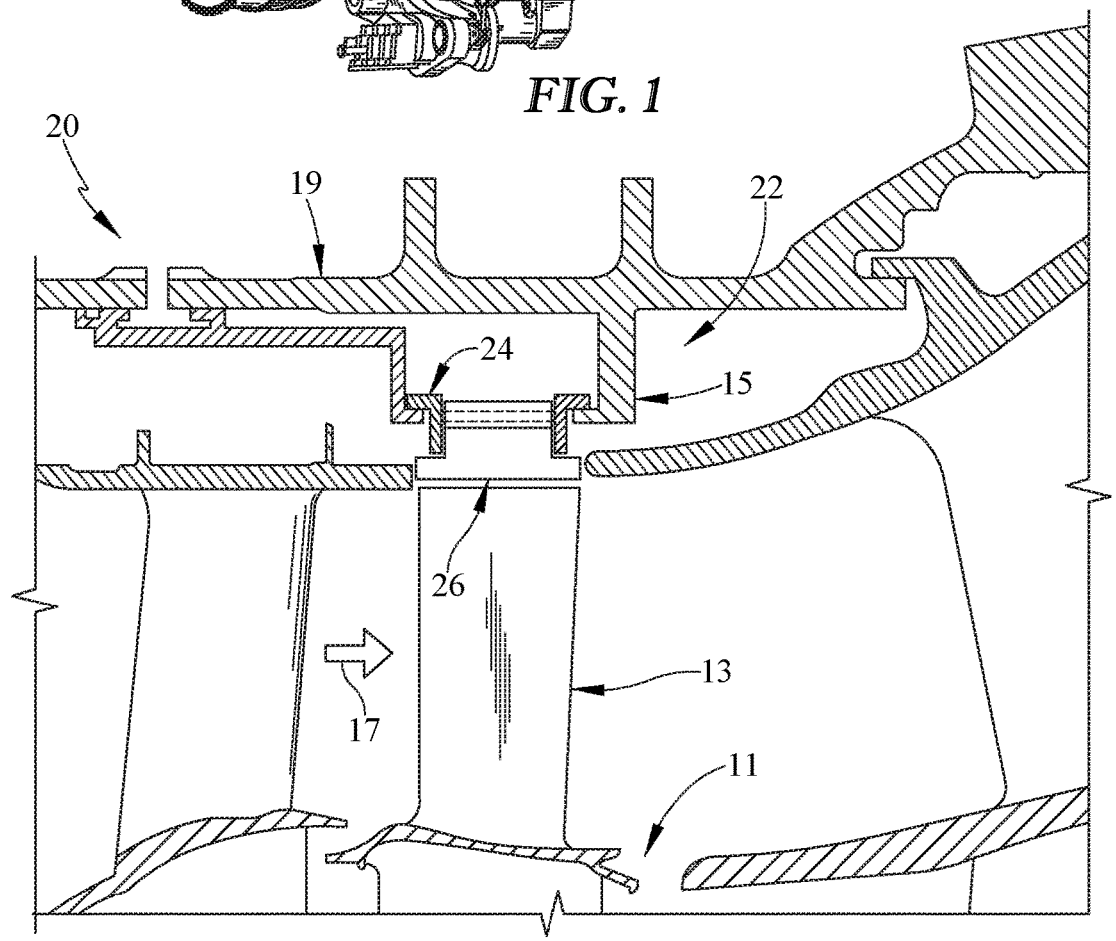
FIG. 2 is a detail cross sectional view of a portion of FIG. 1 showing a turbine shroud segment included in the turbine shroud assembly of FIG. 1 and showing that the turbine shroud segment includes a ceramic matrix composite blade track segment, and an attachment unit for coupling the blade track segment to a metallic carrier.

The turbine 18 includes at least one turbine wheel assembly 11 and a turbine shroud assembly 20 positioned to surround the turbine wheel assembly 11 as shown in FIGS. 1 and 2. Turbine shroud assembly 20 is coupled to a carrier 15 which may be formed separately or together with a turbine case 19 of gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
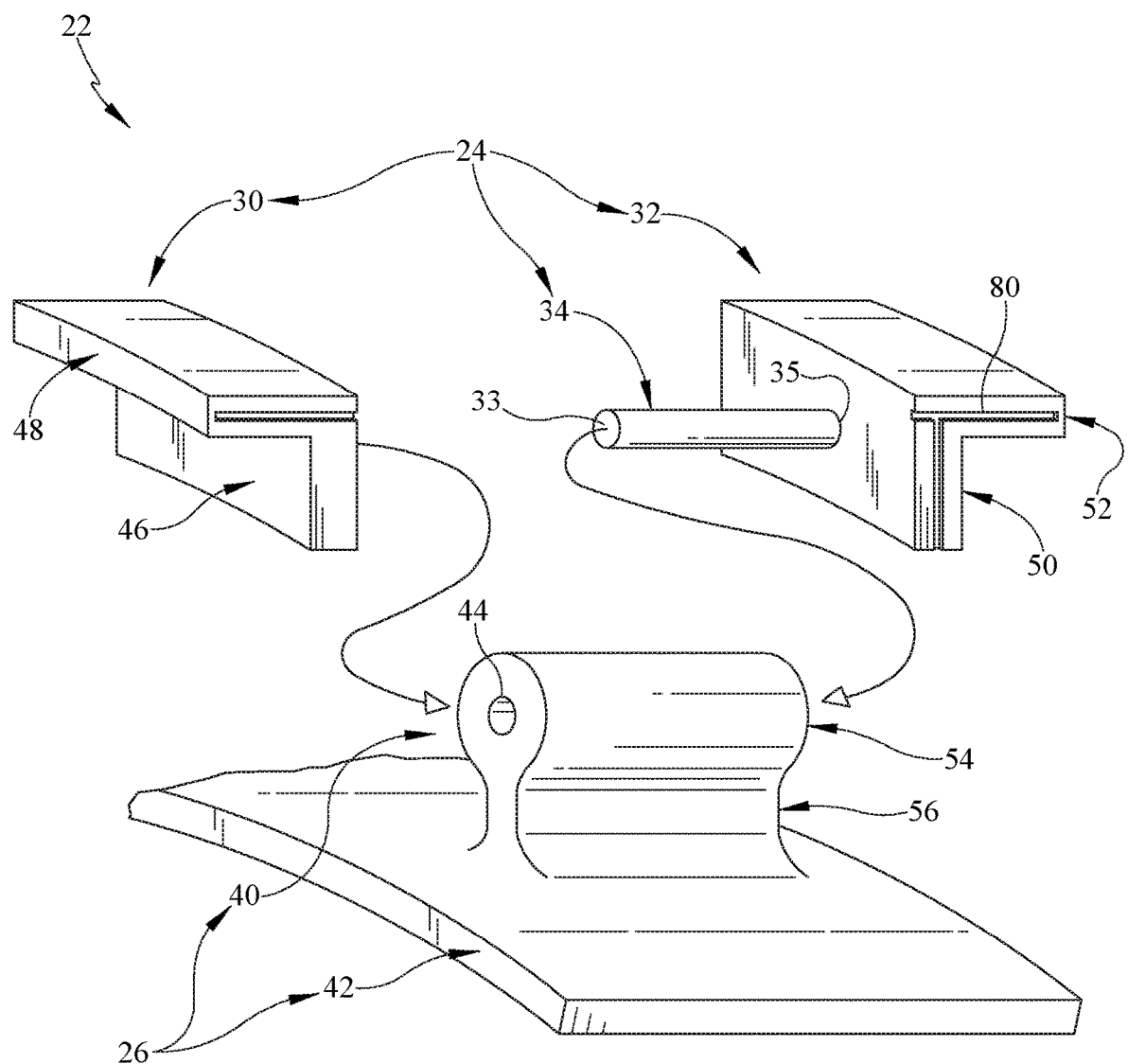
FIG. 3 is an exploded perspective assembly view of the turbine shroud segment from FIG. 2 and showing that the metallic attachment unit includes a forward hanger, an aft hanger, and a mount pin adapted to engage a mount post of the ceramic matrix composite blade track segment.

Turbine shroud assembly 20 extends around the turbine wheel assembly 11 to block combustion products from passing over the blades 13 without pushing the blades 13 to rotate as suggested in FIG. 2. In the illustrative embodiment, turbine shroud assembly 20 is made up of a number of shroud segments 22, one of which is shown in FIG. 3. Each shroud segment 22 extends only part-way around the central axis A and cooperates with other shroud segments 22 to surround the turbine wheel assembly 11.

Turbine shroud segment 22 illustratively includes an attachment unit 24 and a ceramic matrix composite blade track segment 26 as shown in FIG. 3. Attachment unit 24 is a metallic component that is configured to be mounted to carrier 15, which is also metallic, to support ceramic matrix composite blade track segment 26 in position adjacent to the blades 13 of the turbine wheel assembly 11. Blade track segment 26 is a ceramic-matrix composite component adapted to withstand high temperatures and directly faces blades 13 that interact with high temperature gasses. The metallic attachment unit 24 is adapted to transfer loads between the ceramic matrix composite blade track segment 26 and carrier 15 or case 19, thereby reducing bending stresses in blade track segment 16.

Metallic attachment unit 24 has a higher strength capability than ceramic matrix composite blade track segment 26. But, attachment unit 24 is not as efficient at resisting high temperatures within flow path 17 as ceramic matrix composite blade track segment 26. Thus, attachment unit 24 is arranged out of direct contact with the hot gasses in flow path 17 and may operate without the need for cooling. As such, attachment unit 24 is configured to mount turbine shroud segment 22 to carrier 15, turbine case 19, or other components within gas turbine engine 10 while ceramic matrix composite blade track segment 26 is arranged to interact with the hot gasses within flow path 17. Still, cooling features may be incorporated into attachment unit 24 and blade track segment 26.

Attachment unit 24 includes a forward hanger 30, an aft hanger 32, and a mount pin 34 as shown in FIG. 3. Forward hanger 30 forms an L-shaped metallic component. Aft hanger 32 also forms an L-shaped metallic component that is nearly identical to forward hanger 30 except that mount pin 34 is integrated with aft hanger 32 at an aft end 35 of mount pin 34. Mount pin 34 is arranged to extend axially through a corresponding pin receiving hole 44 formed in blade track segment 26. Mount pin 34 is then bonded to forward hanger 30 so that attachment unit 24 supports turbine shroud segment 22 within gas turbine engine 10.

Blade track segment 26 includes a mount post 40 and a runner 42 as shown in FIG. 3. Mount post 40 is formed to include pin receiving hole 44 adapted to receive mount pin 34 to couple blade track segment 26 to attachment unit 24. Runner 42 is an arcuate panel arranged to interface with turbine blades 13 rotating about central axis A. Mount post 40 and runner 42 are integrated as a one-piece ceramic matrix composite blade track segment 26 and may be formed from ceramic plies, ceramic cores, three-dimensionally woven or braided ceramic pre-forms and fibers or any combination of these or other suitable ceramic matrix composite structures.

After mount pin 34 is received within pin receiving hole 44 so that aft hanger 32 is coupled to blade track segment 26, forward hanger 30 is bonded to a forward end 33 of mount pin 34 as suggested in FIG. 3. Forward hanger 30 and forward end 33 of mount pin 34 are illustratively joined by brazing, diffusion welding, mechanical fasteners, or any other suitable assembly method.

Forward hanger 30 may be formed to include a corresponding pin receiving hole (not shown) to receive forward end 33 of mount pin 34 before being joined to forward hanger 30 as described above. The pin receiving hole in forward hanger 30 may be formed to extend all the way through forward hanger 30 so that forward end 33 also extends all the way through forward hanger 30. Mount pin 34 may also be joined to forward hanger 30 directly to the surface of forward end 33.

Forward hanger 30 includes a blade track attachment portion 46 and a carrier attachment portion 48 as shown in FIG. 3. Blade track attachment portion 46 extends radially outward from blade track segment 26 and cooperates with mount pin 34 to couple blade track segment 26 to forward hanger 30. Carrier attachment portion 48 extends axially forward from blade track attachment portion 46.

Aft hanger 32 includes a blade track attachment portion 50 and a carrier attachment portion 52 as shown in FIG. 3. Blade track attachment portion 50 extends radially outward from blade track segment 26 and cooperates with mount pin 34 to couple blade track segment 26 to aft hanger 32. Carrier attachment portion 52 extends axially aft from blade track attachment portion 50.

Mount post 40 includes a head 54 and a spine 56 as shown in FIG. 3. Head 54 is formed to include pin receiving hole 44 and extends axially from forward hanger 30 to aft hanger 32. Spine 56 is coupled between head 54 and runner 42. Illustratively, mount post 40 has a popsicle cross-section, with a thin stem/spine and bulbous rounded head, when viewed in the axial direction, however any suitable cross-section shape may be used. As previously described, mount post 40 is integrated into runner 42 to form a one-piece ceramic matrix composite blade track segment 26. As such, radial forces acting on runner 42 are transferred directly to mount post 40 while bending forces in other areas of blade track segment 26 can be managed.

Head 54 and spine 56 of blade track segment 26 may have any suitable shape for transferring loads from runner 42 to attachment unit 24. Additionally, mount pin 34 and hangers 30, 32 of attachment unit 24 may also have any suitable shape for mounting turbine shroud segment 22 to gas turbine engine 10. In fact, other embodiments relating to attachment unit 24 and blade track segment 26 are also shown in, but not limited to, FIGS. 4-8 and described below.

Figure 4:
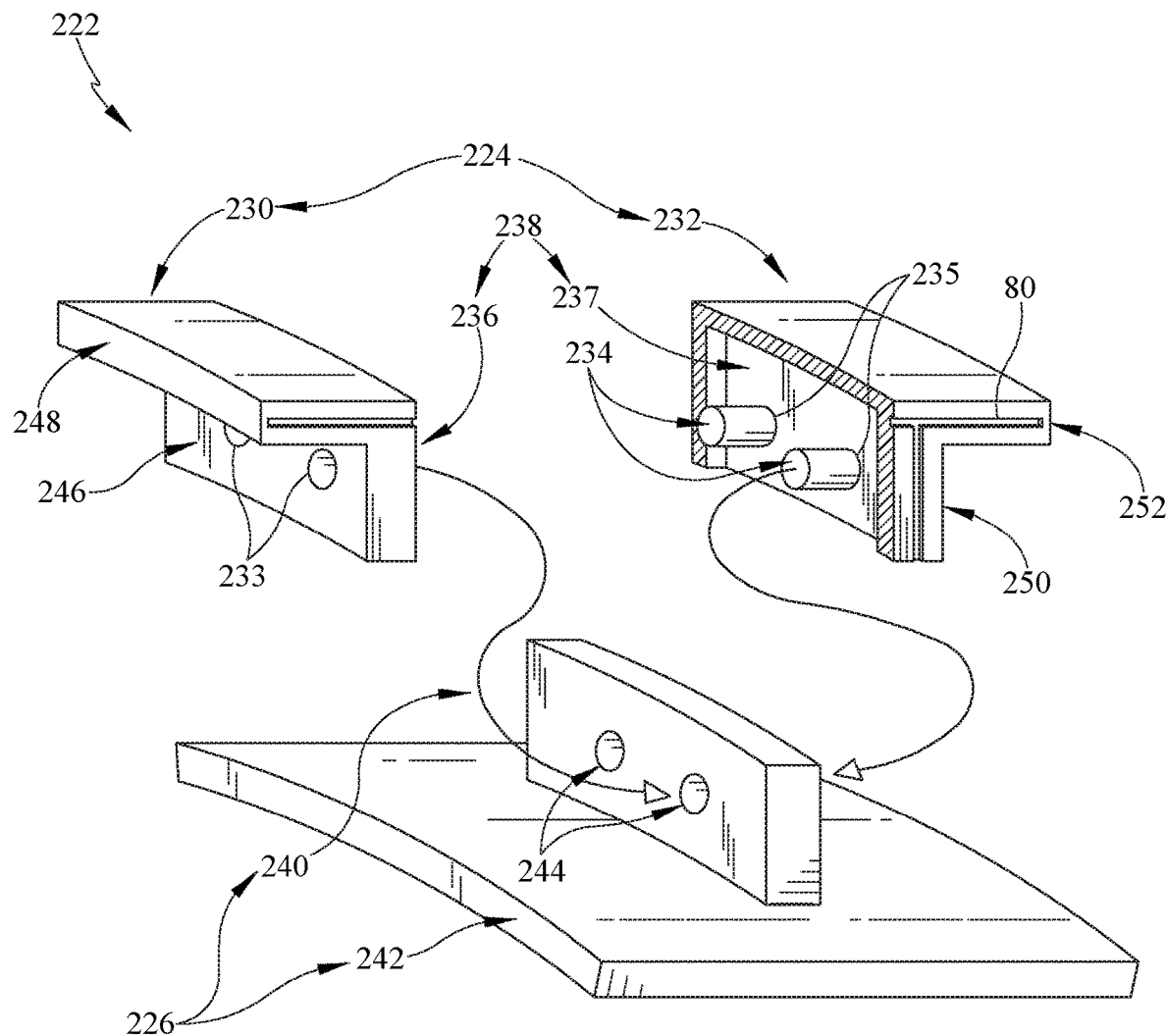
FIG. 4 is an exploded perspective assembly view of a second illustrative turbine shroud segment showing that the attachment unit of the second embodiment forms a mount-post receiving cavity and includes a plurality of mount pins arranged within the mount-post cavity configured to couple the attachment unit to the ceramic matrix composite blade track segment when the turbine shroud segment is assembled.

FIG. 4 shows a second turbine shroud segment 222 that is similar to the turbine shroud 22 in FIG. 3. Turbine shroud segment 222 illustratively includes an attachment unit 224 and a ceramic matrix composite blade track segment 226 as shown in FIG. 4. Attachment unit 224 is a metallic component that is configured to be mounted to carrier 15, which is also metallic, to support ceramic matrix composite blade track segment 226 in position adjacent to the blades 13 of the turbine wheel assembly 11. Blade track segment 226 is a ceramic-matrix composite component adapted to withstand high temperatures and directly faces blades 13 that interact with high temperature gasses. The metallic attachment unit 224 is adapted to transfer loads between the ceramic matrix composite blade track segment 226 and carrier 15 or case 19, thereby reducing bending stresses in blade track segment 16.

Attachment unit 224 includes a forward hanger 230, an aft hanger 232, and a plurality of mount pins 234 as shown in FIG. 4. Forward hanger 230 forms an L-shaped metallic component and is formed to include a forward pocket 236. Aft hanger 232 also forms an L-shaped metallic component that is nearly identical to forward hanger 230 and is formed to include an aft pocket 237. Forward pocket 236 and aft pocket 237 open and face one another in the axial direction.

Mount pins 234 are integrated with aft hanger 232 at aft ends 235 of mount pins 234 within aft pocket 237.

Blade track segment 226 includes a circumferentially extending mount post 240 and a runner 242 as shown in FIG. 4. Mount post 240 is formed to include pin receiving holes 244 adapted to receive mount pins 234 to couple blade track segment 226 to attachment unit 224. Runner 242 is an arcuate panel arranged to interface with turbine blades 13 rotating about central axis A. Mount post 240 and runner 242 are integrated to form a one-piece ceramic matrix composite blade track segment 226. Mount post 240 and runner 242 may be formed from ceramic plies, ceramic cores, three-dimensionally woven or braided ceramic pre-forms and fibers or any combination of these or other suitable ceramic matrix composite structures.

Forward pocket 236 and aft pocket 237 are arranged to form a mount-post receiving cavity 238 when forward hanger 230 and aft hanger 232 are assembled and mount pins 234 extend axially through corresponding pin receiving holes 244. Mount-post receiving cavity 238 is formed to receive at least a portion of mount post 240 and is sized so that attachment unit 224 is interference fit with mount post 240.

After mount post 240 is received within mount-post receiving cavity 238 and mount pins 234 are received within pin receiving holes 244, forward hanger 230 is bonded to mount pins 234 and aft hanger 232 so that attachment unit 224 supports turbine shroud segment 222 within gas turbine engine 10 as suggested in FIG. 4. Illustratively, forward hanger 230 is bonded to mount pins 234 and aft hanger 232 by brazing, diffusion welding, mechanical fasteners, or any other suitable assembly method.

Forward hanger 30 is formed to include a corresponding pin receiving holes 233 to receive mount pins 234 before being joined to forward hanger 230 as described above. Pin receiving holes 233 in forward hanger 230 are extend all the way through forward hanger 230 so that mount pins 234 also extend all the way through forward hanger 230. Mount pin 234 may also be joined to forward hanger 230 directly to the surface of mount pin 234.

Forward hanger 230 includes a blade track attachment portion 246 and a carrier attachment portion 248 as shown in FIG. 4. Blade track attachment portion 246 extends radially outward from blade track segment 226 and cooperates with mount pin 234 to couple blade track segment 226 to forward hanger 230. Carrier attachment portion 248 extends axially forward from blade track attachment portion 246.

Aft hanger 232 includes a blade track attachment portion 250 and a carrier attachment portion 252 as shown in FIG. 4. Blade track attachment portion 250 extends radially outward from blade track segment 226 and cooperates with mount pin 234 to couple blade track segment 226 to aft hanger 232. Carrier attachment portion 252 extends axially aft from blade track attachment portion 250.

Figure 5:
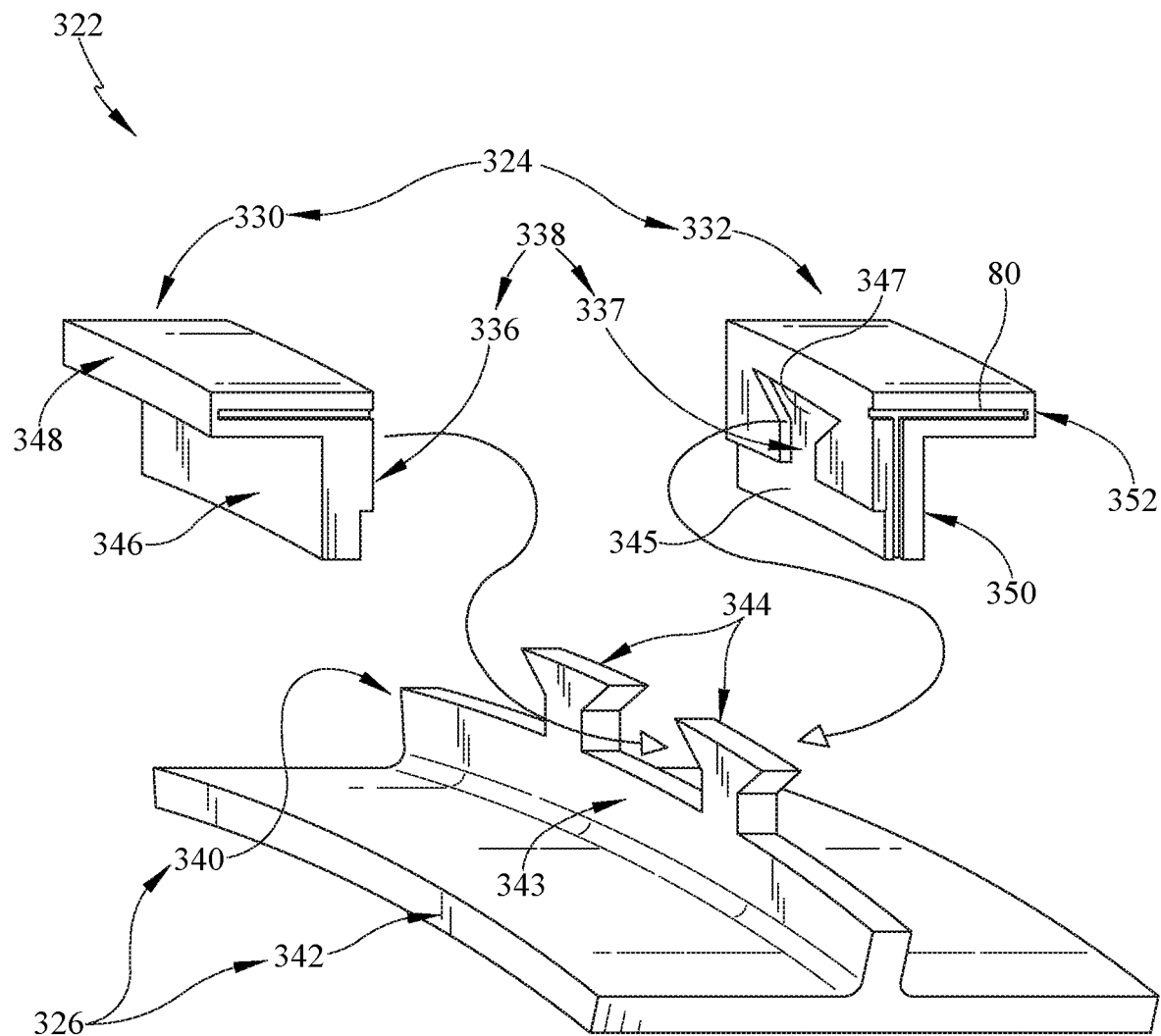
FIG. 5 is an exploded perspective assembly view of a third illustrative turbine shroud segment showing that the ceramic matrix composite blade track segment includes a mount post forming a spine that extends circumferentially around the blade track segment and two dovetail shaped arms and showing that the attachment unit forms a mount-post receiving cavity arranged to receive at least a portion of the spine and the arms when the turbine shroud segment is assembled.

FIG. 5 shows a third turbine shroud 322 that is similar to the turbine shroud 222 in FIG. 4. Turbine shroud segment 322 illustratively includes an attachment unit 324 and a ceramic matrix composite blade track segment 326 as shown in FIG. 5. Attachment unit 324 is a metallic component that is configured to be mounted to carrier 15, which is also metallic, to support ceramic matrix composite blade track segment 326 in position adjacent to the blades 13 of the turbine wheel assembly 11. Blade track segment 326 is a ceramic-matrix composite component adapted to withstand high temperatures and directly faces blades 13 that interact with high temperature gasses. The metallic attachment unit 324 is adapted to transfer loads between the ceramic matrix composite blade track segment 326 and carrier 15 or case 19, thereby reducing bending stresses in blade track segment 326.

Attachment unit 324 includes a forward hanger 330 and an aft hanger 332 as shown in FIG. 5. Forward hanger 330 forms an L-shaped metallic component and is formed to include a forward pocket 336. Aft hanger 332 also forms an L-shaped metallic component that is nearly identical to forward hanger 330 and is formed to include an aft pocket 337. Forward pocket 336 and aft pocket 337 open and face one another in the axial direction and cooperate to form a mount-post receiving cavity 338 when forward hanger 330 and aft hanger 332 are assembled as suggested in FIG. 5.

Blade track segment 326 includes a circumferentially extending mount post 340 and a runner 342 as shown in FIG. 5. Mount post 340 includes a spine 343 and a plurality of dovetail shaped arms 344 adapted to engage mount-post receiving cavity 338 to couple blade track segment 326 to attachment unit 324. Runner 342 is an arcuate panel arranged to interface with turbine blades 13 rotating about central axis A. Mount post 340 and runner 342 are integrated to form a one-piece ceramic matrix composite blade track segment 326. Mount post 340 and runner 342 may be formed from ceramic plies, ceramic cores, three-dimensionally woven or braided ceramic pre-forms and fibers or any combination of these or other suitable ceramic matrix composite structures.

Mount-post receiving cavity 338 is sized so that attachment unit 324 is interference fit with mount post 340 of blade track segment 326. Forward pocket 236 and aft pocket 237 each include a spine portion 345 and an arm portion 347. Spine portions 345 extend circumferentially through forward and aft hangers 330, 332 and are arranged to receive at least a portion of spine 343. Arm portions 347 extend radially outward from spine portions 345 and are arranged to receive arms 344.

After mount post 340 is received within mount-post receiving cavity 338, forward hanger 330 is bonded to aft hanger 332 so that attachment unit 324 supports turbine shroud segment 322 within gas turbine engine 10 as suggested in FIG. 5. Illustratively, forward hanger 330 is bonded to aft hanger 332 by brazing, bonding, diffusion welding, mechanical fasteners, or any other suitable assembly method.

Forward hanger 330 includes a blade track attachment portion 346 and a carrier attachment portion 348 as shown in FIG. 5. Blade track attachment portion 346 extends radially outward from blade track segment 326 and cooperates with spine 343 and arms 344 to couple blade track segment 326 to forward hanger 330. Carrier attachment portion 348 extends axially forward from blade track attachment portion 346 to engage carrier 15 or other components within gas turbine engine 10.

Aft hanger 332 includes a blade track attachment portion 350 and a carrier attachment portion 352 as shown in FIG. 4. Blade track attachment portion 350 extends radially outward from blade track segment 326 and cooperates with spine 343 and arms 344 to couple blade track segment 326 to aft hanger 332. Carrier attachment portion 352 extends axially aft from blade track attachment portion 350 to engage carrier 15 or other components within gas turbine engine 10.

As shown in FIG. 5, forward and aft hangers 330, 332 are adapted to receive only one arm 344 and a portion of spine 343. As such, additional hangers (not shown) that are substantially similar to forward and aft hangers 330, 332 will be included to receive the other arm and the other portion of spine 343. Further, additional arms 344 and complementary hangers may be included. Alternatively, forward and aft hangers 330, 332 may include any number of pockets to complement the number of arms.

Spine 343 and arms 344 of blade track segment 26 may have any suitable shape for coupling blade track segment 326 to attachment unit 324 and transferring loads from runner 342 to attachment unit 324. Additionally, hangers 330, 332 of attachment unit 24 may also have any suitable shape for mounting turbine shroud segment 322 to gas turbine engine 10.

Figure 6:
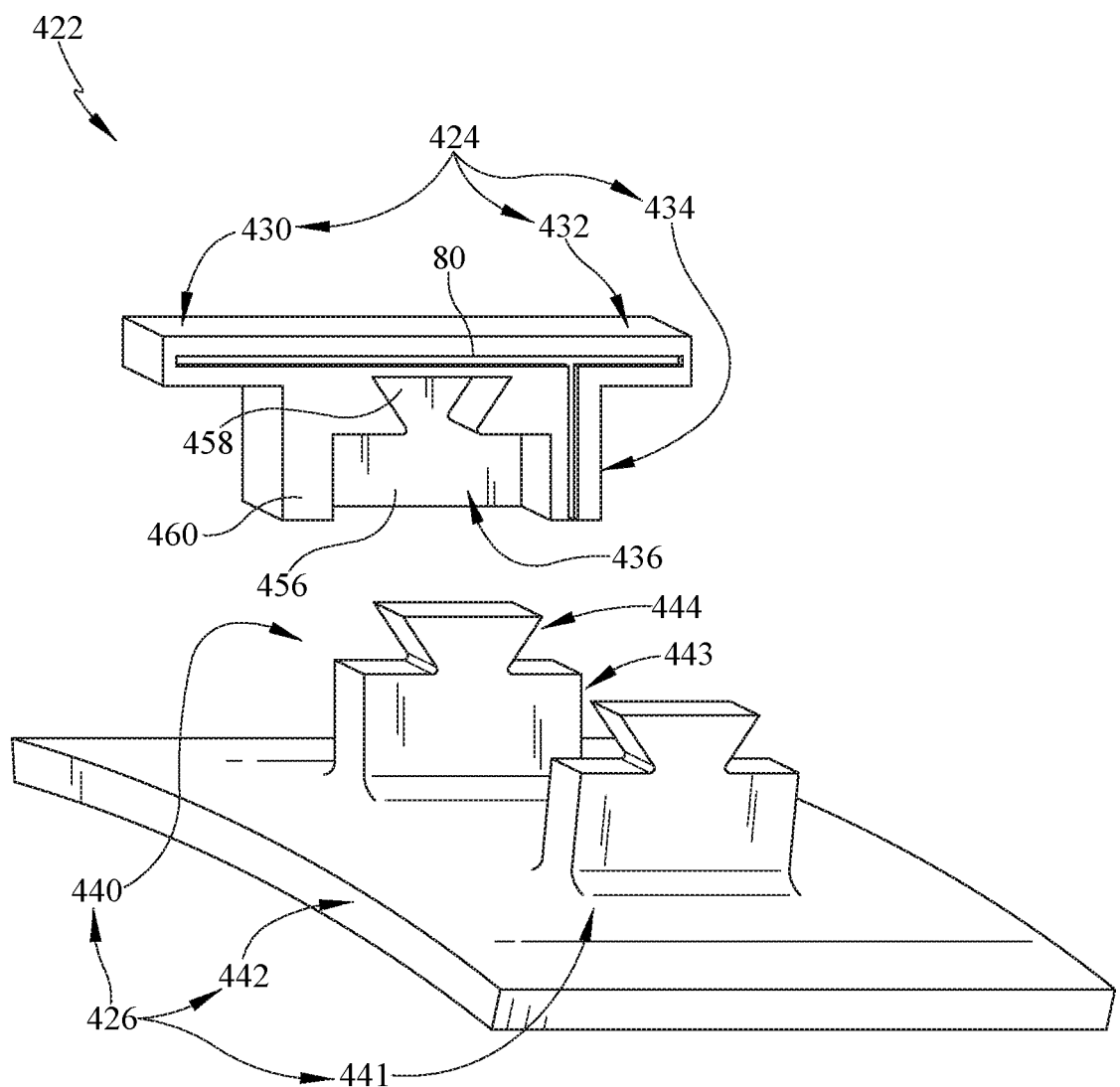
FIG. 6 is an exploded perspective assembly view of a fourth illustrative turbine shroud segment showing that the ceramic matrix composite blade track segment includes a plurality of mount posts each forming an axially-extending spine and a dovetail shaped arm and showing that the attachment unit receives at least a portion of the spines and arms when the turbine shroud segment is assembled.

FIG. 6 shows a fourth turbine shroud 422 that is similar to the turbine shroud 322 in FIG. 4. Turbine shroud segment 422 illustratively includes an attachment unit 424 and a ceramic matrix composite blade track segment 426. Attachment unit 424 is a metallic component that is configured to be mounted to carrier 15, which is also metallic, to support ceramic matrix composite blade track segment 426 in position adjacent to the blades 13 of the turbine wheel assembly 11. Blade track segment 426 is a ceramic-matrix composite component adapted to withstand high temperatures and directly faces blades 13 that interact with high temperature gasses. The metallic attachment unit 424 is adapted to transfer loads between the ceramic matrix composite blade track segment 426 and carrier 15 or case 19, thereby reducing bending stresses in blade track segment 426.

As shown in FIG. 6, attachment unit 424 includes a forward hanger 430, an aft hanger 432 and a mounting body 434. Forward hanger 430 extends axially forward from mounting body 434 to engage with carrier 15 or other components within gas turbine engine 10. Aft hanger 432 extends axially aft of mounting body 434 to engage with carrier 15 or other components within gas turbine engine 10. Mounting body 434 is disposed between forward and aft hangers 430, 432 and is formed to include a first pocket 436.

Illustratively, turbine shroud 422 includes a second attachment unit that is not shown in FIG. 6 but that is a mirrored arrangement of attachment unit 424. As such, the disclosure of attachment unit 424 is incorporated herein by reference for the second attachment unit. The second attachment unit is formed to include a complementary second pocket. The second attachment unit is configured to engage attachment unit 424 on a surface 460 so that first pocket 436 and the second pocket cooperate to form a mount-post receiving cavity.

Blade track segment 426 includes axially extending mount posts 440, 441 and a runner 442 as shown in FIG. 6. Mount post 440 includes a spine 443 and a dovetail-shaped arm 444 adapted to engage mount-post receiving cavity to couple blade track segment 426 to attachment unit 424 and the second attachment unit. Runner 442 is an arcuate panel arranged to interface with turbine blades 13 rotating about central axis A. Mount posts 440, 441 and runner 442 are integrated to form a one-piece ceramic matrix composite blade track segment 426. Mount posts 440, 441 and runner 442 may be formed from ceramic plies, ceramic cores, three-dimensionally woven or braided ceramic pre-forms and fibers or any combination of these or other suitable ceramic matrix composite structures.

Mount post 441 is identical to mount post 440, and, therefore, all disclosure relating to mount post 440 is incorporated herein by reference to mount post 441. However, while attachment unit 424 and the second attachment unit are arranged to receive mount post 440, third and fourth attachment units, which are not shown but that are identical to attachment unit 424 and the second attachment unit, are arranged to receive mount post 441 in the same way. Illustratively, blade track segment 426 may include any number of mount posts that are received by complementary attachment units.

Spine 443 and arms 444 of mount post 440 may have any suitable shape for coupling blade track segment 426 to attachment unit 424 and the second attachment unit and transferring loads from runner 442 to the attachment units. Additionally, forward and aft hangers 430, 432 may have any suitable shape for mounting turbine shroud segment 422 to gas turbine engine 10.

The mount-post receiving cavity is sized so that both attachment units are interference fit with mount post 440 of blade track segment 426. First pocket 436 and the second pocket each include a spine portion 456 and an arm portion 458. Spine portion 456 is arranged to receive at least a portion of spine 443. Arm portion 458 extends radially outward from spine portion 456 and is arranged to receive one arm 444.

After mount post 440 is received within first pocket 436, surface 460 of attachment unit 424 is bonded to a complementary surface of the second attachment unit around mount-post receiving cavity 438 so that the attachment unit supports turbine shroud segment 422 within gas turbine engine 10. Illustratively, attachment unit 424 is bonded to the second attachment unit by brazing, bonding, diffusion welding, mechanical fasteners, or any other suitable assembly method.

Figure 7:
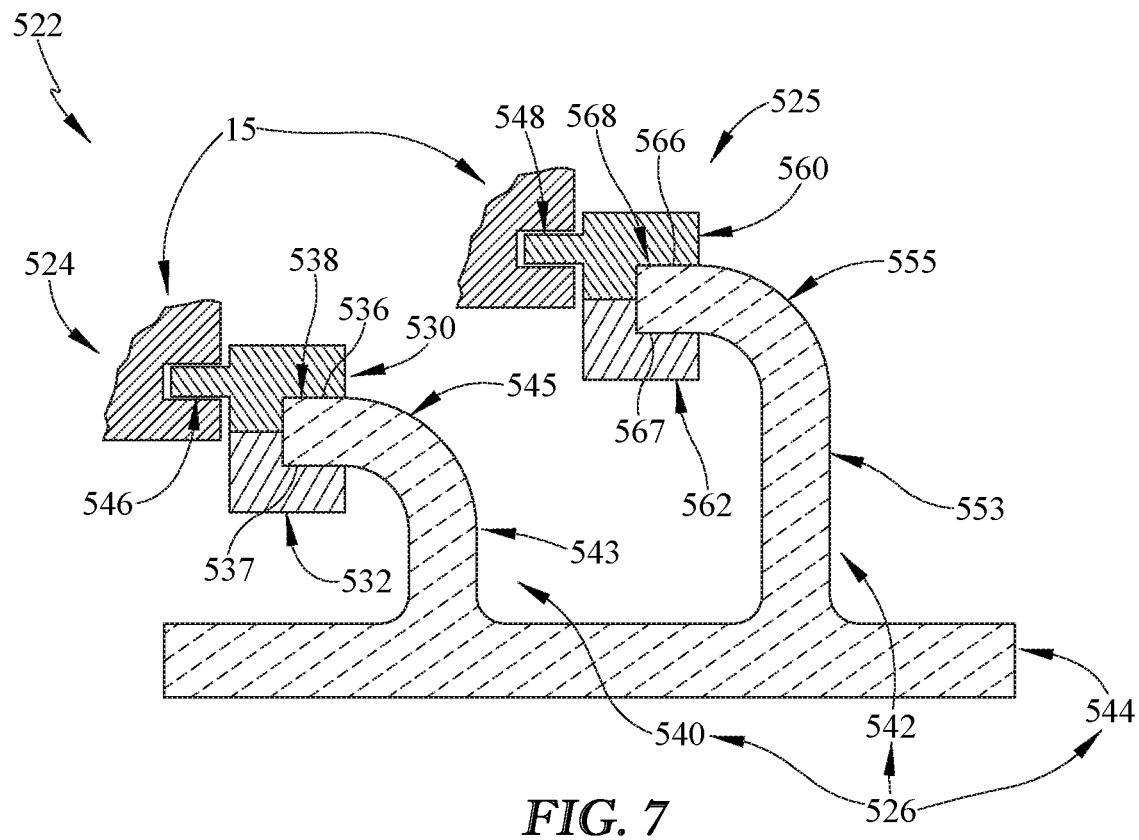
FIG. 7 is an enlarged cross-sectional view of a fifth illustrative turbine shroud segment showing a plurality of attachment units spaced axially and showing that each attachment unit includes an outer piece and an inner piece that form hanger end receiving channels when assembled to receive forward and aft hangers of the ceramic matrix composite blade track segment.

FIG. 7 shows a fifth turbine shroud 522. Turbine shroud segment 522 illustratively includes an attachment unit 524, 525 and a ceramic matrix composite blade track segment 526 as shown in FIG. 7. Attachment unit 524 is a metallic component that is configured to be mounted to carrier 15, which is also metallic, to support ceramic matrix composite blade track segment 526 in position adjacent to the blades 13 of the turbine wheel assembly 11. Blade track segment 526 is a ceramic-matrix composite component adapted to withstand high temperatures and directly faces blades 13 that interact with high temperature gasses. The metallic attachment unit 524 is adapted to transfer loads between the ceramic matrix composite blade track segment 526 and carrier 15 or case 19, thereby reducing bending stresses in blade track segment 526.

Attachment unit 524 includes an outer piece 530 and an inner piece 532 as shown in FIG. 7. Outer piece 530 is a metallic component and is formed to include a top notch or pocket 536. Inner piece 532 also a metallic component and is formed to include a bottom notch or pocket 537. Top notch 536 and bottom notch 537 open and face one another in the radial direction and cooperate to form a hanger-end receiving cavity 538 when outer piece 530 and inner piece 532 are assembled as shown in FIG. 7.

Attachment unit 525 includes an outer piece 560 and an inner piece 562 as shown in FIG. 7. Outer piece 560 is a metallic component and is formed to include a top notch or pocket 566. Inner piece 562 also a metallic component and is formed to include a bottom notch or pocket 567. Top notch 566 and bottom notch 567 open and face one another in the radial direction and cooperate to form a hanger-end receiving cavity 568 when outer piece 560 and inner piece 562 are assembled as shown in FIG. 7.

Blade track segment 526 includes a forward mount post or hanger 540, an aft mount post or hanger 542, and a runner 544 as shown in FIG. 7. Forward hanger 540 includes a stem 543 and curved head 545 adapted to engage hanger-end receiving cavity 538 to couple blade track segment 526 to attachment unit 524. Aft hanger 542 includes a stem 553 and curved head 555 adapted to engage hanger-end receiving cavity 568 to couple blade track segment 526 to attachment unit 525. Runner 542 is an arcuate panel arranged to interface with turbine blades 13 rotating about central axis A.

Forward hanger 540, aft hanger 542, and runner 544 are integrated to form a one-piece ceramic matrix composite blade track segment 326. Forward hanger 540, aft hanger 542, and runner 544 may be formed from ceramic plies, ceramic cores, three-dimensionally woven or braided ceramic pre-forms and fibers or any combination of these or other suitable ceramic matrix composite structures.

Mount-post receiving cavities 538, 568 are sized so that attachment units 524, 525 are interference fit with curved heads 545, 555 of blade track segment 526. After curved head 545 is received within hanger-end receiving cavity 538, outer piece 530 is bonded to inner piece 532 along a bonded interface 547 so that attachment unit 524 supports turbine shroud segment 522 within gas turbine engine 10 as suggested in FIG. 7. Similarly, after curved head 565 is received within hanger-end receiving cavity 568, outer piece 560 is bonded to inner piece 562 along a bonded interface 567 so that attachment unit 525 supports turbine shroud segment 522 within gas turbine engine 10 as suggested in FIG. 7. Illustratively, outer pieces 530, 560 are bonded to inner pieces 532, 562 by brazing, diffusion welding, mechanical fasteners, or any other suitable assembly method.

Outer pieces 530, 560 include a blade track attachment portion 546, 548 as shown in FIG. 7. Blade track attachment portions 546, 548 extend axially forward from outer pieces 530, 560 and couple blade track segment 526 to carrier 15. Illustratively, outer pieces 530, 560 are bonded to blade track attachment portions 546, 548 by brazing, diffusion welding, mechanical fasteners, or any other suitable assembly method.

Figure 8:
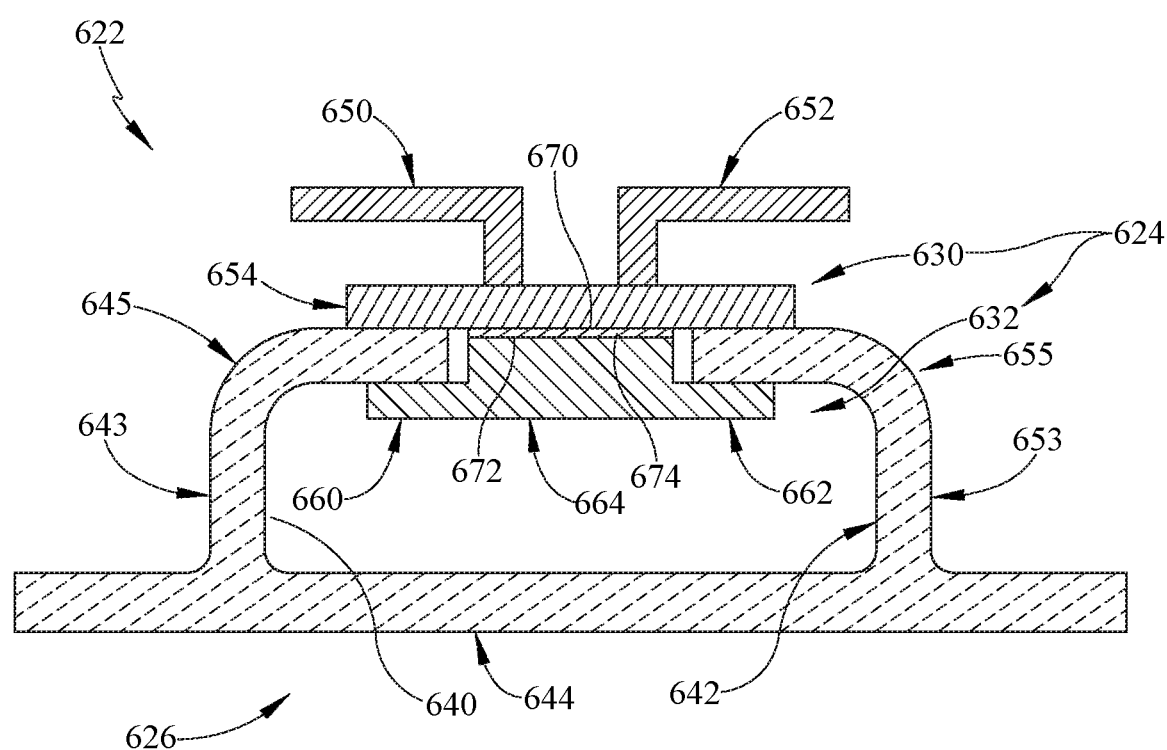
FIG. 8 is an enlarged cross-sectional view of a sixth illustrative turbine shroud segment showing that the attachment unit of the sixth embodiment includes an outer piece and an inner piece and showing that the ceramic matrix blade track segment includes axially forward and aft hangers that converge and are arranged to be engaged by the attachment unit when the outer piece and the inner piece are assembled so as to receive the forward and aft hangers.

FIG. 8 shows a sixth turbine shroud segment 622. Turbine shroud segment 622 illustratively includes an attachment unit 624 and a ceramic matrix composite blade track segment 626 as shown in FIG. 8. Attachment unit 624 is a metallic component that is configured to be mounted to carrier 15, which is also metallic, to support ceramic matrix composite blade track segment 626 in position adjacent to the blades 13 of the turbine wheel assembly 11. Blade track segment 626 is a ceramic-matrix composite component adapted to withstand high temperatures and directly faces blades 13 that interact with high temperature gasses. The metallic attachment unit 624 is adapted to transfer loads between the ceramic matrix composite blade track segment 626 and carrier 15 or case 19, thereby reducing bending stresses in blade track segment 626.

Attachment unit 624 includes an outer piece 630 and an inner piece 632 as shown in FIG. 8. Outer piece 630 and inner piece 632 are both metallic. Outer piece 630 and inner piece 632 cooperate to form hanger-end receiving cavities 638, 639 when outer piece 630 and inner piece 632 are assembled as shown in FIG. 8.

Outer piece 630 is a metallic component that includes a forward hanger 650, and aft hanger 652, and a mounting plate 654. Forward hanger 650 and aft hanger 652 extend axially forward and aft of mounting plate 654 and engage with carrier 15 or other components within gas turbine engine 10. Mounting plate 654 includes a bonding surface 670 that faces radially downward toward inner piece 632.

Inner piece 632 includes a forward support 660, an aft support 662, and a body 664 disposed between the forward support 660 and aft support 662. Forward support 660 cooperates with mounting plate 654 to form hanger-end receiving cavity 638. Aft support 662 cooperates with mounting plate 654 to form hanger-end receiving cavity 639. Body 664 extends radially upward from blade track segment 626 and provides a bonding surface 672 that is configured to engage with bonding surface 670 to form a bond interface 674 between outer piece 630 and inner piece 632. Illustratively, outer piece 630 is bonded to inner piece 632 by brazing, diffusion welding, mechanical fasteners, or any other suitable assembly method.

Blade track segment 626 includes a forward mount post or hanger 640, an aft mount post or hanger 642, and a runner 644 as shown in FIG. 8. Forward mount post 640 includes a stem 643 and curved head 645 adapted to engage hanger-end receiving cavity 638 to couple blade track segment 626 to attachment unit 624. Aft mount post 642 includes a stem 653 and curved head 655 adapted to engage hanger-end receiving cavity 639 to couple blade track segment 626 to attachment unit 624. Runner 644 is an arcuate panel arranged to interface with turbine blades 13 rotating about central axis A.

Forward mount post 640, aft mount post 642, and runner 644 are integrated to form a one-piece ceramic matrix composite blade track segment 626. Forward mount post 640, aft mount post 642, and runner 644 may be formed from ceramic plies, ceramic cores, three-dimensionally woven or braided ceramic pre-forms and fibers or any combination of these or other suitable ceramic matrix composite structures.

Mount-post receiving cavities 638, 639 are sized so that attachment unit 624 is interference fit with curved heads 645, 655 of blade track segment 626. After curved heads 645, 655 are received within hanger-end receiving cavities 638, 639 outer piece 630 is bonded to inner piece 632 along bond interface 674 so that attachment unit 624 supports turbine shroud segment 622 within gas turbine engine 10 as shown in FIG. 8.

Strip seals 80 may be provided on the attachment unit of any of the embodiments disclosed herein. Strip seals 80 are configured to engage circumferentially adjacent turbine shroud segments to resist the movement of hot gases from flowpath 17 between interfaces formed between adjacent turbine shroud segments.

According to the present disclosure structures and methods for incorporating a metallic attachment features into a ceramic matrix composite (CMC) seal segment are taught. In illustrative embodiments, this may require that the seal segment be a multi-piece assembly that consists of a CMC flowpath element and a single or, more likely, multi piece metallic element that is used to efficiently transfer load from the CMC element to an intermediate carrier or the case.

In illustrative embodiments, the structures and methods described in this paper may involve the use of a pin. In illustrative embodiments, the CMC segment may have a vertical feature with a single or a plurality of holes introduced axially through the feature. In illustrative embodiments, holes may be a close tolerance to minimize the relative movement between the CMC element and the metallic attachment element(s) and properly transfer load. In illustrative embodiments, it is envisioned that one of the metallic elements may have integral close tolerance pins. In illustrative embodiments, these pins may be inserted through the holes in the CMC element and a second metallic element with either blind or through holes would interface with the pins from the opposing side of the vertical feature in the CMC element.

In illustrative embodiments, the two metallic elements may then be joined together by brazing or diffusion bonding to form an inseparable assembly. In illustrative embodiments, the metallic elements would be fabricated of a sufficient size to allow for incorporation of the features required to attach the seal segment assembly to an intermediate carrier or the case.

In illustrative embodiments, the vertical feature in the CMC may contain dovetails (or other similar type of feature) that may interface with the metallic elements. In illustrative embodiments, it is envisioned that one of the metallic elements may incorporate features or voids that are the negatives of the dovetails in the CMC element. In illustrative embodiments, both the male and female features may be required to be close tolerance to minimize relative motion between the CMC and metallic elements and appropriately transfer load.

In illustrative embodiments, the two metallic elements may then be joined together by brazing or diffusion bonding to form an inseparable assembly. In illustrative embodiments, the metallic elements may be fabricated of a sufficient size to allow for incorporation of the features required to attach the seal segment assembly to an intermediate carrier or the case.

In illustrative embodiments, metallic hanger features may be bonded/formed around existing hanger features that are integral with the CMC. The reason for utilizing this style of integrated metallic hanger is to minimize the sliding friction between the seal segment and the intermediate carrier or case. One benefit of this idea is that it may be possible to optimize stresses in the CMC component by optimizing the attachment of the attachment feature. In illustrative embodiments, this optimization could reduce bending stresses that are imparted by "hook" features that would be required if the CMC part were to incorporate the attachment features within the CMC component itself. In addition, this optimization could take advantage of pure, or near pure, radial loading of the vertical features in the CMC component. In so doing, any bending stresses may be reduced or eliminated leaving stresses to act along a line of action that is parallel to fiber placement with in the CMC component thus optimizing the load path.

In illustrative embodiments, another benefit is the ability to use a tight "birdmouth" to attach the metallic elements into the intermediate carrier or case. By using a birdmouth, leakage may be more controllable. In illustrative embodiments, this type of arrangement may not be utilized with fully CMC seal segments due to the difference in the coefficient of thermal expansion between the CMC and the metallic interfacing feature. In illustrative embodiments, with a fully CMC seal segment, the interface may be either a single point of contact or two points at the outermost extremities of the seal segment.

In illustrative embodiments, the metallic components that are attached to the CMC may be designed to contain the attachment features. One potential benefit of such an arrangement is that the metallic elements may be used in locations where temperatures are significantly reduced relative to the flowpath. This may allow the metallic parts to operate in an environment where they do not require any active cooling. Another potential benefit is that as the metallic components can have significantly more strength capability, they are not as adversely affected by stress concentrations and bending loads that may be imparted in the attachment features between the seal segment assembly and the carrier or case.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted for use in a gas turbine engine, the turbine shroud comprising
   a blade track segment comprising ceramic matrix composite materials, the blade track segment formed to include an arcuate runner that extends partway about a central axis and a mount post that extends radially outward from the arcuate runner, and
   an attachment unit comprising metallic materials coupled to the blade track segment and configured to support the blade track segment radially relative to the central axis, the attachment unit including a forward hanger arranged along an axially forward side of the mount post and an aft hanger arranged along an axially aft side of the mount post, the forward hanger being a separate component from the aft hanger, each of the forward and aft hangers engaged with the mount post and shaped to provide a radially-inwardly facing surface configured to contact a radially-outwardly facing surface of another component included in the gas turbine engine such that the attachment unit is supported radially relative to the central axis on the radially-inward facing surfaces by the another component,
   wherein the forward hanger is formed to include a recessed pocket, the aft hanger is formed to include a recessed pocket that cooperates with the recessed pocket of the forward hanger to form a radially-inwardly-opening mount-post receiving space, and the mount post is arranged inside the mount-post receiving space,
   wherein the mount-post receiving space is sized so that the attachment unit is interference fit with the mount post of the blade track segment so that a surface of the forward hanger located in the mount-post receiving space is directly engaged with a fore surface of the mount post and a surface of the aft hanger located in the mount-post receiving space is directly engaged with an aft surface of the mount post, and the mount post includes a radial outer surface that extends between and directly interconnects the fore surface and the aft surface of the mount post.

2. The turbine shroud of claim 1, wherein the mount post is formed to include a pin-receiving hole that extends axially through the mount post and the attachment unit includes a mount pin that extends from the forward hanger to the aft hanger through the pin-receiving hole to couple the attachment unit to the blade track segment.

3. The turbine shroud assembly of claim 2, wherein the forward hanger is located axially forward of the aft hanger.

4. The turbine shroud assembly of claim 2, wherein the forward hanger is bonded to the aft hanger along an edge of the mount-post receiving space.

5. The turbine shroud assembly of claim 4, wherein the forward hanger is bonded to the aft hanger by a diffusion weld formed along the edge of the mount-post receiving space.

6. The turbine shroud assembly of claim 1, wherein the mount post includes a stem that extends from the runner of the blade track segment and a head that extends from the stem, the head is shaped to extend axially or circumferentially from the stem to form a radial retention surface, and the mount-post receiving space is formed to have a shape complementary to the shape of the head included in the mount post such that the retention surface of the head engages complementary surfaces of the attachment unit and the blade track segment is blocked from radially-inward movement relative to the attachment unit.

7. The turbine shroud assembly of claim 6, wherein the head of the mount post forms a dovetail shape.

8. The turbine shroud assembly of claim 6, wherein the head of the mount post forms a first dovetail and a second dovetail spaced apart circumferentially from the first dovetail.

9. A turbine shroud assembly adapted for use in a gas turbine engine, the turbine shroud assembly comprising
a blade track segment comprising ceramic matrix composite materials, the blade track segment formed to include an arcuate runner that extends partway about a central axis and a mount post that extends radially outward from the arcuate runner, and
an attachment unit comprising metallic materials coupled to the blade track segment, the attachment unit including a first hanger arranged along a first side of the mount post and a second hanger arranged along a second side of the mount post opposite the first side, each of the first and second hangers engaged with the mount post and shaped to have a radially-inwardly facing surface,
wherein the first hanger is formed to include a recessed pocket that extends into the first hanger, the second hanger is formed to include a recessed pocket that extends into the second hanger and that cooperates with the recessed pocket of the first hanger to form a mount-post receiving space, the mount post is arranged inside the mount-post receiving space, the first hanger is bonded to the second hanger along the edge of the mount-post receiving space, and the mount-post receiving space is sized so that the attachment unit is interference fit with the mount post of the blade track segment.

10. The turbine shroud assembly of claim 9, wherein the first hanger is bonded to the second hanger along an edge of the mount-post receiving space by a diffusion weld.

11. The turbine shroud assembly of claim 10, wherein mount post is formed to include a pin-receiving hole that extends axially through the mount post and the attachment unit includes a mount pin that extends from the first hanger to the second hanger through the pin-receiving hole to couple the attachment unit to the blade track segment.

12. The turbine shroud assembly of claim 9, wherein the mount post includes a stem that extends from the runner of the blade track segment and a head that extends from the stem, the head is shaped to extend axially or circumferentially from the stem to form a radial retention surface, and the mount-post receiving space is formed to have a shape complementary to the shape of the head included in the mount post such that the retention surface of the head engages complementary surfaces of the attachment unit and the blade track segment is blocked from radially-inward movement relative to the attachment unit.

13. The turbine shroud assembly of claim 12, wherein the first hanger is bonded to the second hanger along the edge of the mount-post receiving space by a diffusion weld.

14. The turbine shroud assembly of claim 12, wherein the head of the mount post forms a first dovetail and a second dovetail spaced apart circumferentially from the first dovetail.

15. The turbine shroud assembly of claim 9, wherein the first hanger and the second hanger are separate components.

16. The turbine shroud assembly of claim 9, wherein the mount post includes a first surface and a second surface such that the first surface and the second surface converge to form a dovetail shape, a first portion of the first surface and the second surface of the mount post are supported on the first hanger, and a second portion of the first surface and the second surface of the mount post are supported on the second hanger.

17. A turbine shroud assembly adapted for use in a gas turbine engine, the turbine shroud assembly comprising
a blade track segment comprising ceramic matrix composite materials, the blade track segment formed to include an arcuate runner that extends partway about a central axis and a mount post that extends radially outward from the arcuate runner, and the mount post includes a first surface and a second surface that converge toward the central axis to form a dovetail shape, and
an attachment unit comprising metallic materials coupled to the blade track segment, the attachment unit including a first hanger arranged along a first side of the mount post and a second hanger arranged along a second side of the mount post opposite the first side,
wherein the first hanger is formed to include a recessed pocket that receives a first portion of the first surface and the second surface and the second hanger is formed to include a recessed pocket that that receives a second portion of the first surface and the second surface so that the mount post is supported by the first hanger and the second hanger in a mount-post receiving space.

18. The turbine shroud assembly of claim 17, wherein the mount post extends circumferentially relative to the central axis.

19. The turbine shroud assembly of claim 17, wherein the mount post is a first mount post, the blade track segment includes a second mount post that is spaced apart circumferentially from the first mount post, and the first mount post and the second mount post extend axially.

20. The turbine shroud assembly of claim 17, wherein the mount-post receiving space is sized so that the attachment unit is interference fit with the mount post of the blade track segment.

* * * * *